UNITED STATES PATENT OFFICE.

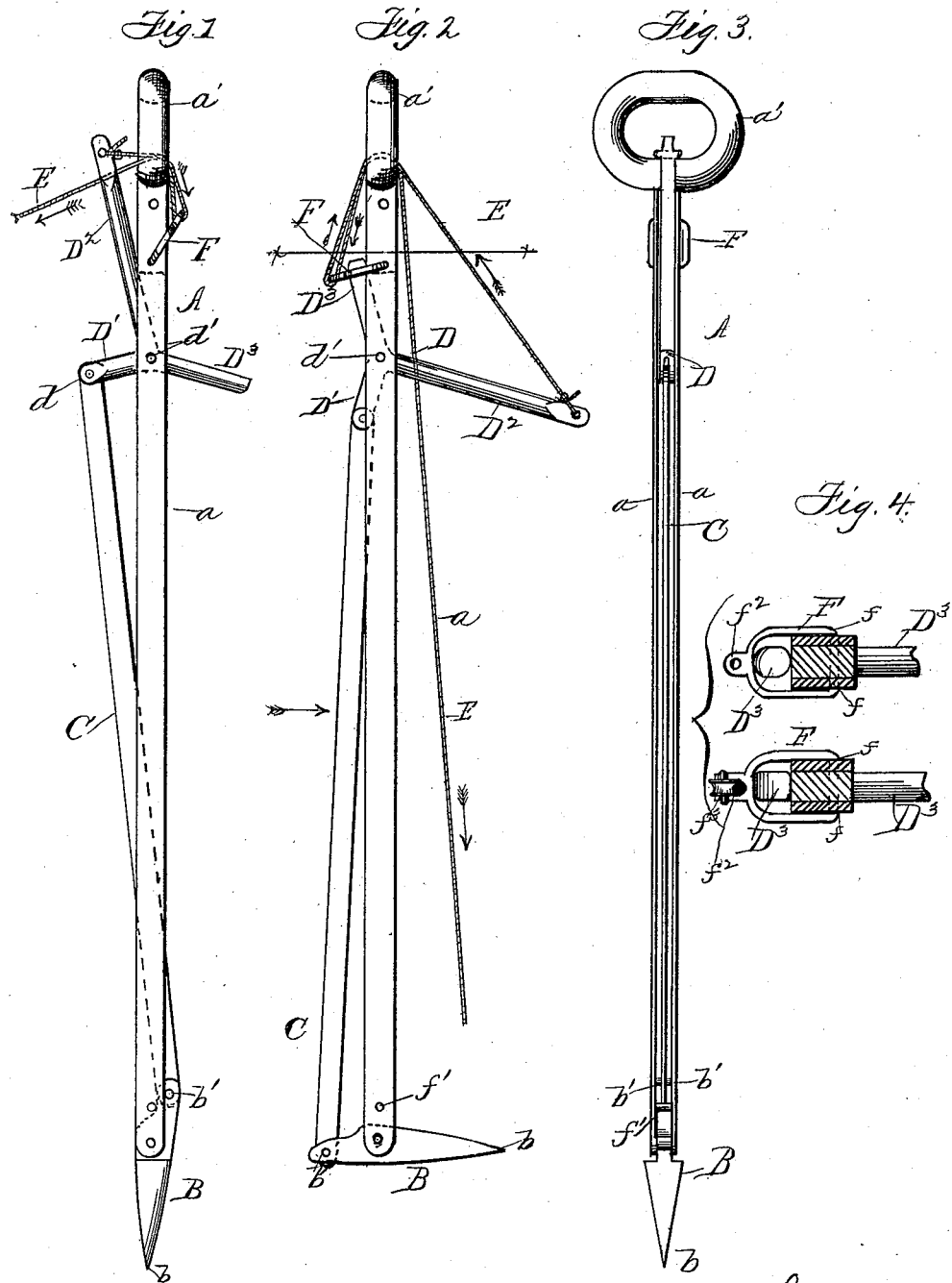

PHILLIP WERUM, OF STRYKER, OHIO.

HORSE HAY-FORK.

SPECIFICATION forming part of Letters Patent No. 308,294, dated November 18, 1884.

Application filed March 12, 1884. (No model.)

*To all whom it may concern:*

Be it known that I, PHILLIP WERUM, a citizen of the United States, residing at Stryker, in the county of Williams and State of Ohio, have invented certain new and useful Improvements in Horse Hay-Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to hay-forks, and has for its object the provision of an implement that shall be simple, durable, and easily operated. It further has for its object the provision of a fork having means whereby, when the fork is loaded, it may be locked against being opened by accidents—such as striking against obstacles, &c.—and, when desired, unlocked and the load thereon discharged.

To the accomplishment of the above my invention consists in the construction, arrangement, and combination of parts, substantially as hereinafter more fully described, and specifically pointed out in the claims.

In the drawings, Figure 1 represents a hay-fork embodying my improvements open for insertion into hay, straw, &c. Fig. 2 represents a view of the same fork as it appears when loaded. Fig. 3 is an edge view of the device represented in Fig. 1. Fig. 4 is a transverse sectional view taken on the line $x\,x$ of Fig. 2.

Similar letters of reference in the several drawings denote similar parts.

Referring to the drawings, A designates the fork, having side pieces, $a\,a$, the handle $a'$ being secured between the upper ends of said side pieces, as shown.

B designates a tine pivoted between the lower ends of the side pieces, $a\,a$. The lower end of the tine is pointed, as shown at $b$, in order that it may easily penetrate hay, &c., the opposite upper end of the tine B having pivotal lugs or ears $b'\,b'$, between which is pivoted the lower end of a connecting-rod, C, the upper end of which is pivoted between lugs $d$, formed upon one arm, D', of a three-armed lever, D, pivoted at $d'$ between the side pieces, $a\,a$, near the upper ends thereof, as shown. The lever D is provided with a long arm, $D^2$, the outer end of which is provided with an aperture, in which is secured one end of the discharging line or cord E. The remaining arm, $D^3$, of the lever D, by coming in contact with the lower end of the handle-piece, serves as a stop to limit the upward swing of the point $b$ of the tine B, as shown.

F represents a loop, pivoted at $f$ in the side pieces, $a\,a$, near the tops thereof, and is adapted to clasp the outer end of the arm $D^3$ when the latter is swung upward and into the position shown in Fig. 2, and serves as an auxiliary lock to hold up the arm $D^3$, and thereby prevent the premature discharge of the load, which would be the case were the connecting-link or three-armed lever to strike an object with sufficient force and in a favorable position during the elevation of a loaded fork. The loop F is provided with an eye, $f^2$, or small pulley $f^3$ at its outer edge, to receive the cord E. $f'$ represents a pin passing through the side pieces, $a\,a$, near their lower portions, in order to keep the tine B, when open, in line with the side pieces, $a$.

The operation of my improvement is as follows: The fork, being open—that is to say, in the position shown in Fig. 1—is inserted into the hay, after which the long arm $D^2$ of the lever D is drawn downward and into the position shown in Fig. 2, whereby the tine B is set substantially at right angles to the side pieces, $a$, as shown in said Fig. 2. The loop F is now slipped over the end of the arm $D^3$. The cord E passes, as shown, from the end of the long arm $D^2$ through the handle $a'$, to and through the eye $f^2$ of the loop F, thence back through the handle, and thence to the ground. By drawing upon the cord the loop F will be raised away from the arm $D^3$, and the long arm $D^2$ will be elevated, thus forcing the tine into the position shown in Fig. 1, and releasing the hay thereon.

I do not confine myself to the exact form and construction of the parts herein shown and described, and would therefore have it understood that I can make such changes in mere details of construction as fairly fall within the scope of my invention—as, for instance, the tine need not necessarily stand at right angles to the body of the fork.

Having thus fully described my invention, what I claim, and desire to secure by Letters Patent of the United States, is—

1. In a hay-fork, the combination, with the frame or body, constructed as described, a pivoted tine, and a connecting-rod, of the three-armed lever, the pivot of which is at the point where the arms intersect, whereby two of the arms are adapted to strike upon opposite sides of the fork, as set forth.

2. A hay-fork having the body formed of bars, between which the tine and the shank of the eye or handle are riveted, in combination with a pivoted tine, a connecting-rod, and a three-armed lever, the upper end of the connecting-rod and one arm of the lever adapted to pass between said bars, the other arms of said lever striking against the shank of the eye on opposite sides thereof as the tine is thrown, as set forth.

3. In a hay-fork, the combination of the body, the tine, the connecting-rod, the three-armed lever, and a loop and cord, which form a secondary or supplemental locking device, as set forth.

In testimony whereof I affix my signature in presence of two witnesses.

PHILLIP WERUM.

Witnesses:
JAMES M. HAWKINS,
H. E. HUFFMAN.